United States Patent [19]

Koszarsky

[11] Patent Number: 5,786,991
[45] Date of Patent: Jul. 28, 1998

[54] PROGRAMMABLE VOLTAGE SOURCE

[75] Inventor: Christopher R. Koszarsky, Holly Springs, N.C.

[73] Assignee: Ericsson Inc., Research Triangle Park, N.C.

[21] Appl. No.: 742,483

[22] Filed: Nov. 1, 1996

[51] Int. Cl.$^6$ ................................................ H02M 7/06
[52] U.S. Cl. .......................... 363/84; 363/126; 455/572
[58] Field of Search .............................. 363/13–14, 1, 363/84, 89, 125, 126; 379/22–27, 29–30, 413; 455/572

[56] References Cited

U.S. PATENT DOCUMENTS

| | | | |
|---|---|---|---|
| 4,510,439 | 4/1985 | Roth | 324/73 AT |
| 4,607,288 | 8/1986 | Freyberger | 358/242 |
| 4,636,964 | 1/1987 | Jacobs et al. | 364/483 |
| 5,136,719 | 8/1992 | Gaskill et al. | 455/193.1 |
| 5,235,273 | 8/1993 | Akar et al. | 324/158 R |
| 5,414,443 | 5/1995 | Kanantani et al. | 345/95 |
| 5,521,959 | 5/1996 | Walsworth et al. | 379/27 |
| 5,524,288 | 6/1996 | Monge Navarro et al. | 455/180.4 |

FOREIGN PATENT DOCUMENTS

| | | | |
|---|---|---|---|
| 0 060 342 A1 | 9/1982 | European Pat. Off. | H03K 5/02 |
| 0 372 430 A2 | 6/1990 | European Pat. Off. | H03J 7/28 |
| 0 391 655 A2 | 10/1990 | European Pat. Off. | G09G 3/36 |
| 0 601 743 A1 | 6/1994 | European Pat. Off. | H03J 1/00 |
| 36 03 482 A1 | 8/1987 | Germany | G05F 1/46 |
| 62-155798 | 6/1987 | Japan | H03F 1/32 |
| 64 806 | 4/1989 | Japan | H03F 1/32 |
| WO 93/07598 | 4/1993 | WIPO | G05B 5/22 |

*Primary Examiner*—Jeffrey L. Sterrett
*Attorney, Agent, or Firm*—Burns, Doane, Swecker & Mathis, LLP

[57] ABSTRACT

A programmable, low-current voltage source for small-signal electronic equipment, such as portable cellular telephones, is achievable by generating and applying a bias voltage and a reference voltage across a voltage divider circuit. Consequently, a low-current output voltage is generated at the center junction of the voltage divider circuit. Adjustment of the low-current output voltage level is accomplished by adjusting either the bias voltage level and/or the reference voltage level. The adjustment of the bias voltage level and/or the reference voltage level, in turn, is controlled by a programmable, microprocessor-based waveform generator.

28 Claims, 5 Drawing Sheets

PROGRAMMABLE VOLTAGE SOURCE

BACKGROUND

The present invention relates to voltage sources for small-signal electronic devices. More particularly, the present invention relates to a programmable, negative voltage source for electronic devices such as portable cellular telephones.

In certain small-signal electronic devices, e.g., portable cellular telephones, negative voltage sources are required for certain low current applications. For example, a low-current, negative voltage source is required for providing a negative bias voltage for various electronic stages and for biasing GaAs MESFETs, which are commonly used as amplifiers in the transmitter section of a portable cellular telephone, and for powering LCD displays. Low-current negative voltage sources are also used for regulating voltage controlled oscillators in dual-band cellular telephones.

Traditionally, the required voltage levels are provided by dedicated voltage regulators. However, such regulators provide fixed voltage levels. They are inflexible and non-programmable. Hence, their voltage levels cannot be varied. Consequently, a separate voltage regulator must be employed for each required voltage.

SUMMARY

It is an object of the invention to provide a low-current, negative voltage source that can be readily varied in response to changing circumstances.

It is another object of the present invention to provide a programmable, low-current, negative voltage source for small-signal electronic devices.

It is yet another object of the invention to provide a low-current, negative voltage source for small-signal electronic devices such as portable cellular telephones.

The aforementioned and other objects of the invention are achieved by a voltage source comprising: a programmable waveform generator for generating a digital bit stream which represents an AC waveform; a digital-to-analog converter responsive to the digital bit stream and for converting the digital bit stream into an analog AC waveform; and a rectifier circuit for converting the analog AC waveform into a substantially DC voltage, wherein said rectifier circuit is connected to said digital-to-analog converter by a coupling device.

The aforementioned and other objects of the invention are also achieved by a voltage source comprising: rectifier means for converting an analog AC waveform into a substantially DC voltage; a microprocessor for controlling the generation of a digital bit stream which represents a DC reference voltage level, wherein the digital bit stream representing the DC reference voltage level is stored in a memory associated with said microprocessor; a digital-to-analog converter for converting the DC reference voltage level to an analog DC reference voltage level; and a voltage divider, wherein said voltage divider outputs a low-current voltage as a function of the analog DC reference voltage level and the substantially DC voltage.

The aforementioned and other objects are again achieved by a voltage source comprising: means for generating one of a plurality of AC waveforms; means for generating a first DC voltage level from a plurality of DC voltage levels; rectification and filtering means for converting said one of a plurality of AC waveforms into a second DC voltage level; and voltage divider means for generating a bias voltage as a function of said first DC voltage level and said second DC voltage level, wherein said means for generating one of a plurality of AC waveforms includes means for modifying AC waveform shape, AC waveform amplitude and AC waveform frequency.

BRIEF DESCRIPTION OF THE DRAWINGS

The objects and advantages of the invention will be understood by reading the following detailed description in conjunction with the drawings in which.

DETAILED DESCRIPTION

Figure 1:
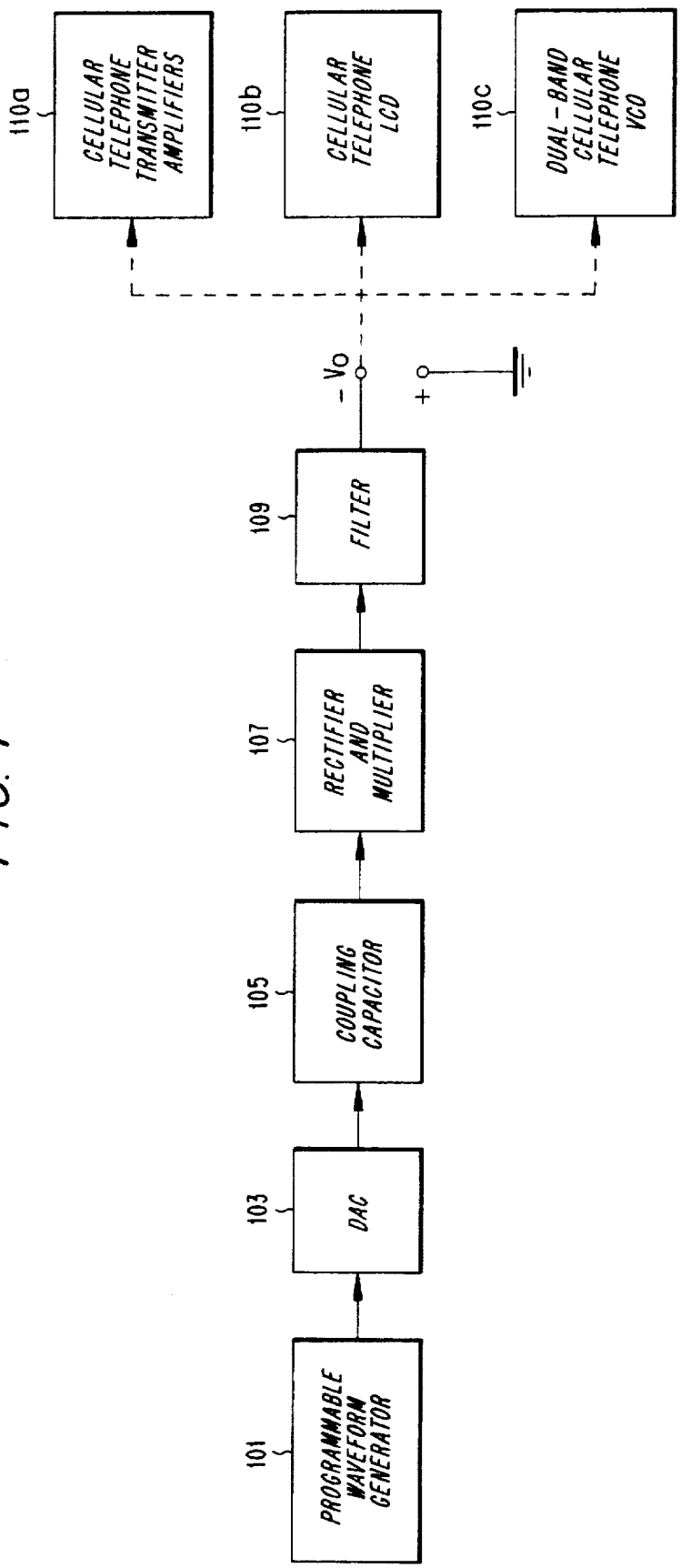
FIG. 1 is a block diagram illustrating the basic components of the present invention.

FIG. 1 shows the basic components of the present invention which include: a programmable waveform generator 101, a digital-to-analog converter (DAC) 103, a coupling capacitor 105, a rectifier and multiplexer circuit 107, and a filter 109. FIG. 1, blocks 110a, 110b and 110c, shows that the programmable, negative voltage $V_O$ can, for example, be utilized for biasing dual-gate MESFET amplifiers in the transmitter section of a cellular telephone, for biasing the liquid crystal display (LCD) of a cellular telephone, and for regulating a voltage controlled amplifier (VCO) in a dual-band cellular telephone.

Figure 2:
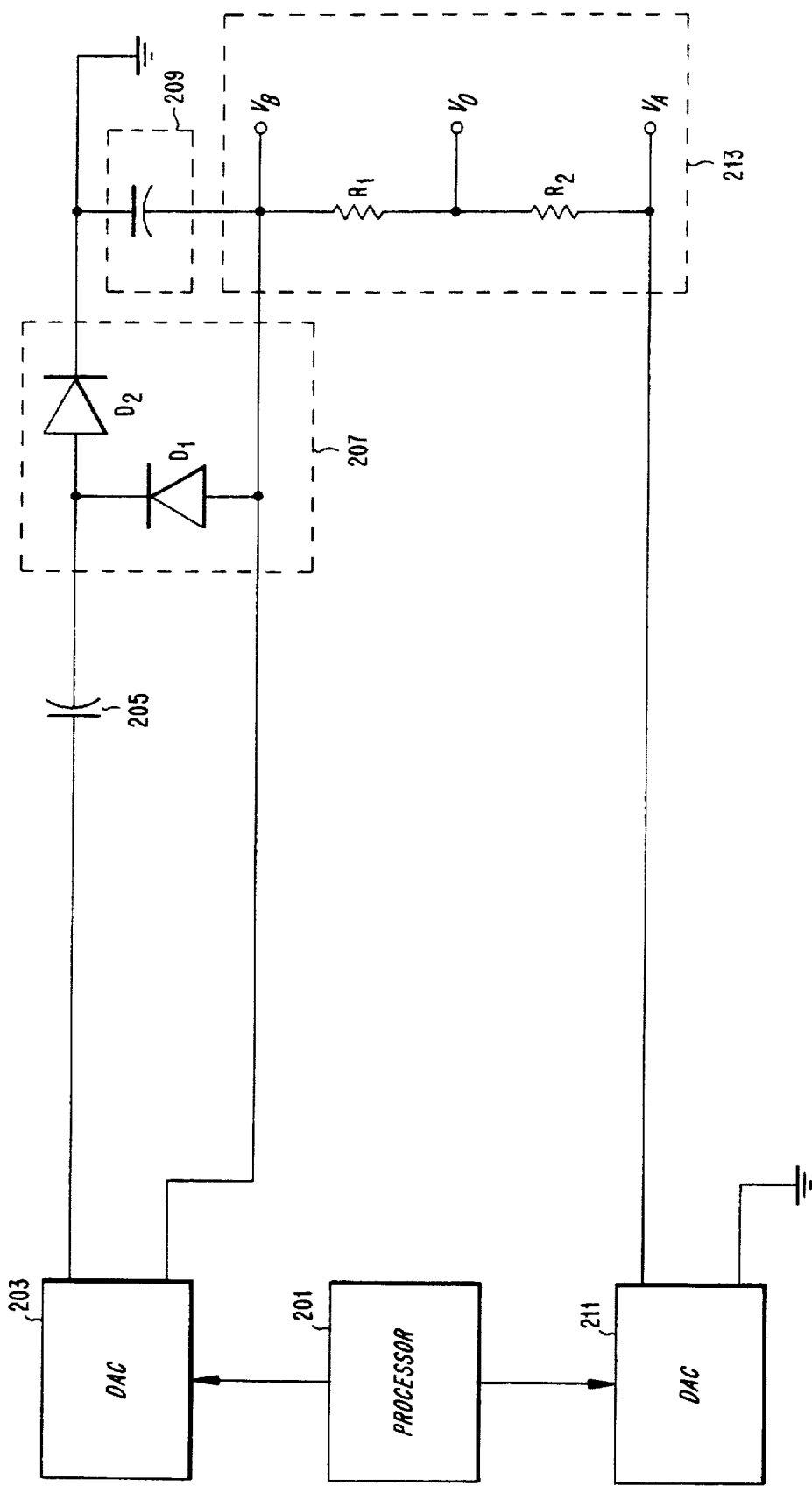
FIG. 2 is a circuit diagram illustrating an exemplary embodiment of the present invention.

In a first exemplary embodiment of the present invention, as illustrated in FIG. 2, a microprocessor 201 controls the generation of a sequence of digital signals representing an AC waveform, for example, a square wave having a fundamental frequency of approximately 100 KHz. However, one skilled in the art will understand that other AC waveforms may be generated, such as sawtooth waveforms and sinusoidal waveforms. The digital values representing the AC waveform are stored in a memory (not shown) associated with the microprocessor 201. A DAC 203 then converts the digital AC waveform to an analog AC waveform. The analog AC waveform is then coupled through a capacitor 205 to a rectifier/multiplier circuit 207 which rectifies the analog AC waveform producing a negative, substantially DC voltage. The coupling capacitor 205 serves as a low to medium pass filter.

In the above-identified exemplary embodiment, the rectifier/multiplier circuit 207 is a voltage-doubler comprising a pair of diodes $D_1$ and $D_2$. However, one skilled in the art will also readily understand that other rectifier circuit configurations may be employed to accomplish this task, such as voltage triplers, quadruplers, and full-wave bridges.

Once rectified and multiplied, the substantially DC voltage encounters a low-pass filter 209, which is designed to further smooth the substantially DC voltage. This produces a first voltage $V_B$ which is a negative DC voltage.

A second DAC 211, also operatively connected to the microprocessor 201, produces a second voltage $V_A$. In the exemplary embodiment, the second voltage $V_A$ is a positive DC voltage. The difference between the negative voltage $V_B$ and the positive voltage $V_A$ is applied across a voltage divider circuit 213. The voltage divider circuit 213 comprises resistors $R_1$ and $R_2$. The center junction between resistors $R_1$ and $R_2$ serves as the output point from which a low-current voltage $V_O$ is generated.

An advantage of this exemplary embodiment is that the low-current voltage $V_O$, can be varied by programming the microprocessor 201 to modify the positive DC voltage level of $V_A$. Although, one skilled in the art will understand that the low-current, voltage $V_O$ can also be controlled by varying the amplitude of the AC waveform in lieu of, or in addition to, varying the voltage level of $V_A$. Moreover, the voltage level of $V_A$ and/or the amplitude of the AC waveform can be adjusted so as to produce either a positive or a negative output voltage $V_O$, wherein a positive voltage output $V_O$ can be made to exceed the available supply voltage through the employment of voltage-multiplying rectifier circuits.

Figure 3:
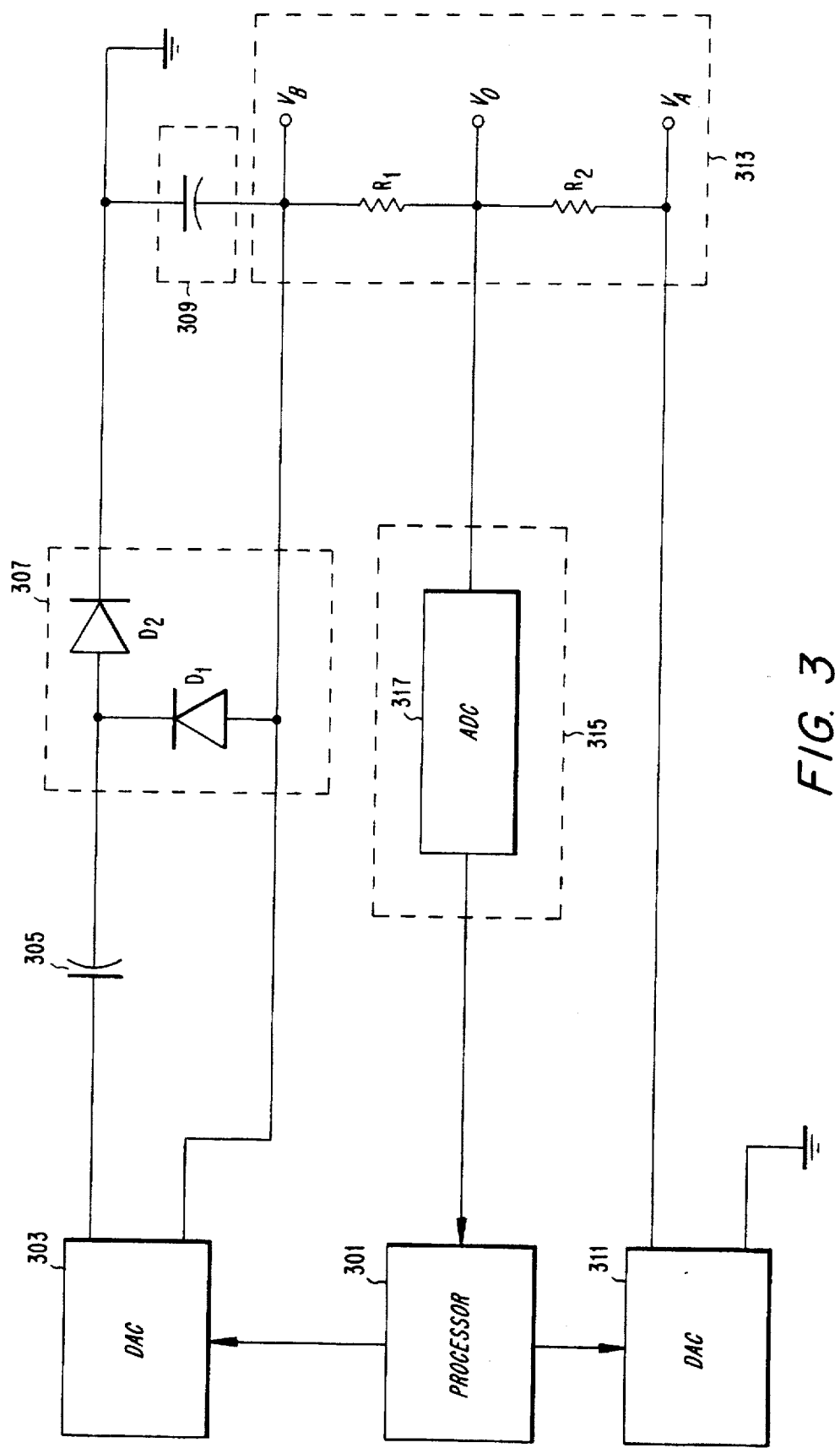
FIG. 3 is a circuit diagram illustrating an alternative embodiment of the present invention wherein the output voltage is regulated by a feedback path.

In a second exemplary alternative embodiment, as illustrated in FIG. 3, the low-current, voltage output $V_O$ is regulated by a feedback circuit 315. The feedback circuit comprises an analog-to-digital converter (ADC) 317, which digitizes (i.e., samples) the output voltage $V_O$ and supplies the digital values to the microprocessor 301. The microprocessor 301 then compares the digitized values with a desired output voltage $V_D$. Based upon the outcome of this comparison, the microprocessor 301 takes corrective action by adjusting the positive DC voltage level of $V_A$, or in the alternative, by adjusting the amplitude of the AC waveform.

Figure 4:
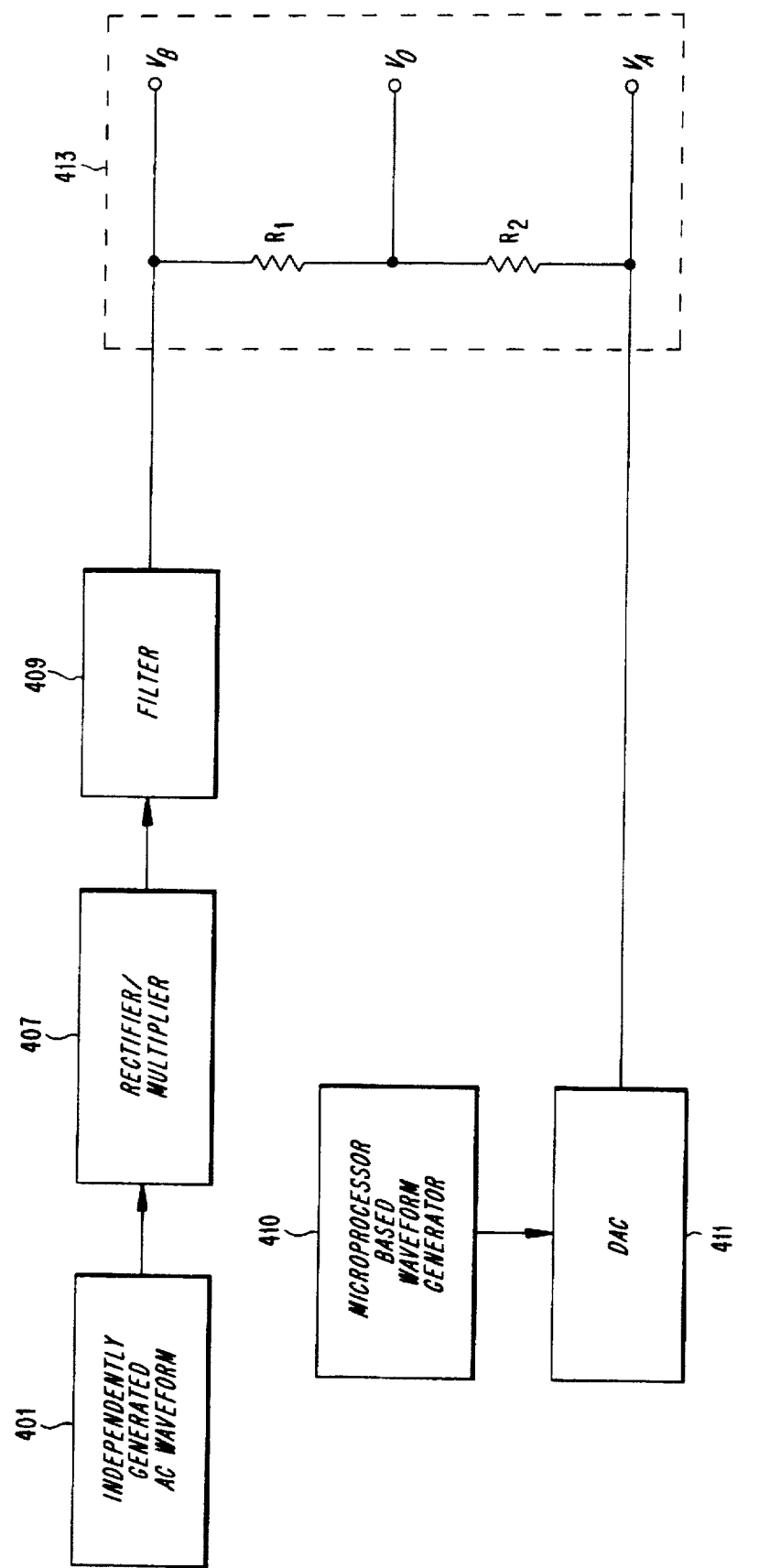
FIG. 4 is a circuit diagram illustrating another alterative embodiment of the present invention, wherein the AC waveform is independently generated.

FIG. 4 illustrates yet a third exemplary embodiment of the present invention, which operates in a similar manner as the exemplary embodiments depicted in FIGS. 2 and 3, but for the AC waveform used to create $V_B$ is independently generated, as illustrated in block 401. In contrast to the above-described embodiments, the AC waveform associated with $V_B$ is not generated by the microprocessor, such as microprocessor 201 in FIG. 2. Rather, the AC waveform is independently generated, for example, by a temperature controlled crystal oscillator (TCXO) or a transistor-transistor logic (TTL) device, such that the periodic loading of a digitized AC waveform from a microprocessor to a digital-to-analog converter is no longer necessary. Therefore, an independently generated analog AC waveform is coupled directly to a rectifier/multiplier circuit, for example, the rectifier/multiplier circuit 407. In this embodiment, the microprocessor 410 controls the low-current voltage output $V_O$ by adjusting the voltage level of $V_A$.

Figure 5:
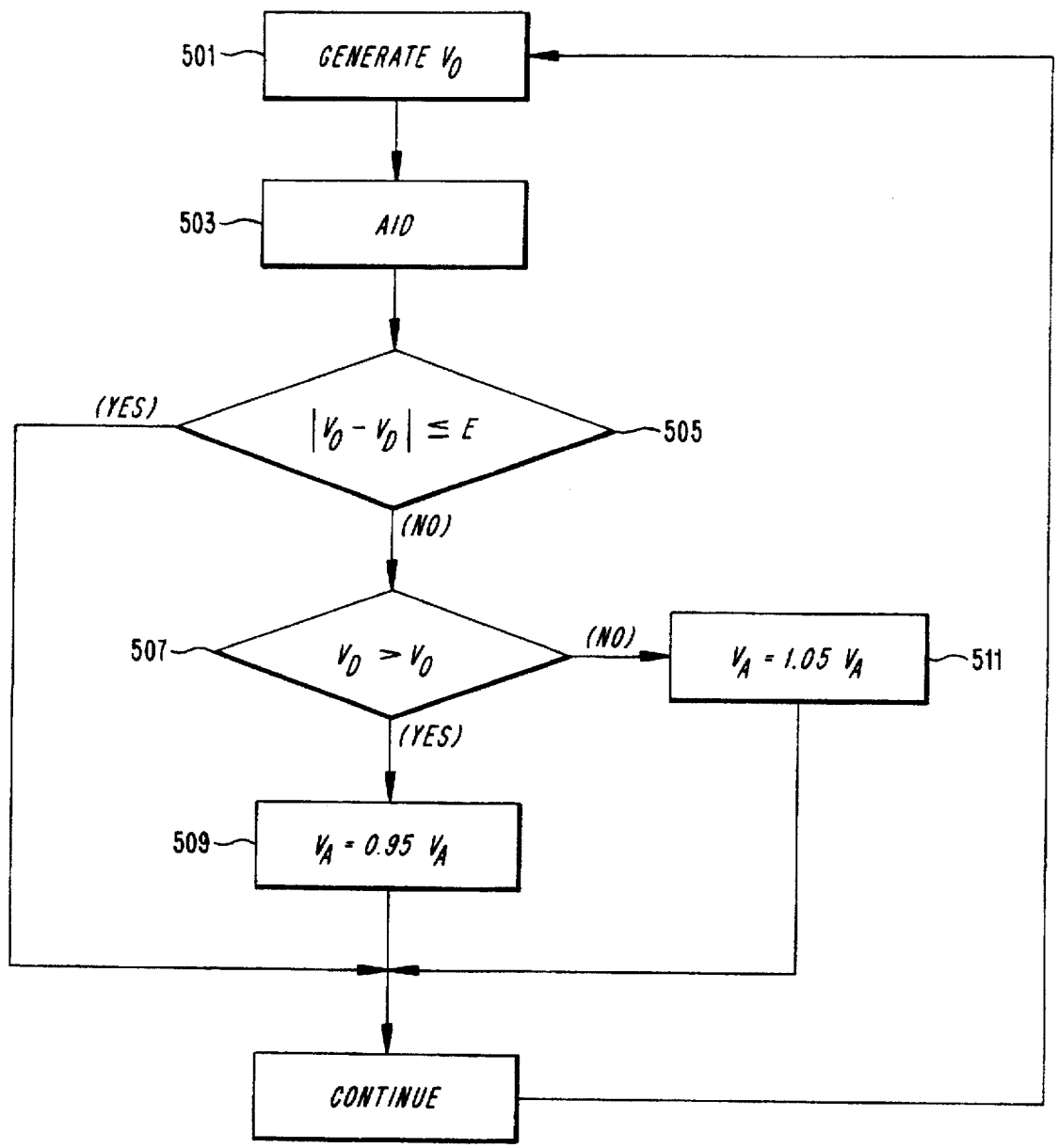
FIG. 5 is a flow chart depicting the method steps of an exemplary control algorithm.

FIG. 5 illustrates the method steps of an exemplary control algorithm that may be used to control the output voltage $V_O$ in accordance with the exemplary embodiment shown in FIG. 3. In accordance with FIG. 5, an output voltage $V_O$ is generated, as illustrated by step 501, which is then digitized (i.e., sampled) by the ADC 317, as illustrated by step 503. Each of the digitized values of the output voltage $V_O$ is then supplied to the microprocessor 301 which determines the difference between each digitized value and a predefined, desired voltage output value $V_D$. Each difference value is then compared to a predefined threshold value E, in accordance with step 505. If the difference value is less than the predefined threshold E, in accordance with the "YES" path out of decision block 505, the microprocessor 301 need not take corrective action and another digitized value of the output voltage $V_O$ is retrieved. If, however, the difference between the sampled output voltage $V_O$ and the desired output voltage $V_D$ is not less than the predefined threshold E, in accordance with the "NO" path out of decision block 505, the microprocessor 301 determines whether the desired output voltage $V_D$ is greater than or less than the digitized value of the output voltage $V_O$, according to step 507. If $V_D$ is greater than $V_O$, in accordance with the "YES" path out of decision block 507, the microprocessor 301 will lower the voltage level of $V_A$, for example, by 5% as shown in step 509. If $V_D$ is less then $V_O$, in accordance with the "NO" path out of decision block 507, the microprocessor 301 will increase the voltage level of $V_A$, for example by 5%, as shown in step 511. Again, one skilled in the art will understand that alternative control algorithms may be employed to achieve the same purpose.

The present invention has been described with reference to a few exemplary embodiments. However, it will be readily apparent to those skilled in the art that it is possible to embody the invention in specific forms other than the exemplary embodiments described above, and that this may be done without departing from the spirit of the invention. The exemplary embodiments described hereinabove are merely illustrative and should not be considered restrictive in any way. The scope of the invention is given by the appended claims, rather than the preceding description, and all variations and equivalents which fall within the range of the claims are intended to be embraced therein.

What is claimed is:

1. A cellular telephone comprising:

a programmable waveform generator for generating a digital bit stream which represents an AC waveform;

a digital-to-analog converter responsive to the digital bit steam and for converting the digital bit stream into an analog AC waveform;

a rectifier circuit for converting the analog AC waveform into a substantially DC voltage, wherein said rectifier circuit is connected to said digital-to-analog converter by a coupling device;

an electronic cellular telephone module; and means for applying the substantially DC voltage to the electronic, cellular telephone module, wherein the substantially DC voltage provides a bias voltage for the electronic, cellular telephone module.

2. The cellular telephone in accordance with claim 1, wherein the coupling device is a coupling capacitor.

3. The cellular telephone in accordance with claim 1, further comprising a smoothing filter for removing residual periodicity from the substantially DC waveform.

4. The cellular telephone in accordance with claim 1, wherein the electronic, cellular telephone module is a transmitter amplifier.

5. The cellular telephone in accordance with claim 1, wherein the electronic cellular telephone module is a liquid crystal display.

6. The cellular telephone in accordance with claim 1, wherein the cellular telephone is a dual-band cellular telephone, and wherein the electronic cellular telephone module is a voltage controlled oscillator.

7. A programmable, low-current voltage source comprising:

rectifier means for converting an analog AC waveform into a substantially DC voltage;

a microprocessor for controlling the generation of a digital bit stream which represents a DC reference voltage level, wherein the digital bit stream representing the DC reference voltage level is stored in a memory associated with said microprocessor;

a digital-to-analog converter for converting the DC reference voltage level to an analog DC reference voltage level; and a voltage divider, wherein said voltage divider outputs a low-current voltage as a function of the analog DC reference voltage level and the substantially DC voltage.

8. The programmable, low-current voltage source in accordance with claim 7, wherein said voltage divider comprises at least two impedance devices.

9. The programmable, low-current voltage source in accordance with claim 8, wherein the at least two impedance devices are resistors.

10. The programmable, low-current voltage source in accordance with claim 7, further comprising:
a second digital-to-analog converter connected to said microprocessor, wherein said microprocessor generates a second digital bit stream representing a digital equivalent of the analog AC waveform and said second digital-to-analog converter converts the second digital bit stream into the analog AC waveform;
a coupling means for coupling the analog AC waveform to said rectifier means and for removing high frequency components from the analog AC waveform; and
a smoothing filter responsive to said substantially DC voltage generated by said rectifier means, said smoothing filter further removing residual periodicity from the substantially DC voltage.

11. The programmable, low-current voltage source in accordance with claim 10, wherein said coupling means is a coupling capacitor.

12. The programmable, low-current voltage source in accordance with claim 10, further comprising:
feedback means for generating a third digital bit stream which represents a digital equivalent of the low-current voltage, wherein said feedback means supplies the third digital bit stream to said microprocessor, and wherein said microprocessor adjusts the low-current voltage by modifying the second digital bit stream which represents the analog AC waveform.

13. The programmable, low-current voltage source in accordance with claim 10, further comprising:
feedback means for generating a third digital bit stream which represents a digital equivalent of the low-current voltage, wherein said feedback means supplies the third digital bit stream to said microprocessor, and wherein said microprocessor adjusts the low-current voltage by modifying the digital bit stream which represents the DC reference voltage level.

14. The programmable, low-current voltage source in accordance with claim 7, wherein said rectifier means comprises:
at least one diode, so as to magnify and provide a negatively biased, substantially DC voltage.

15. A voltage source comprising:
means for generating one of a plurality of AC waveforms;
means for generating a first DC voltage level from a plurality of DC voltage levels;
rectification and filtering means for converting said one of a plurality of AC waveforms into a second DC voltage level;
voltage divider means for generating a bias voltage as a function of said first DC voltage level and said second DC voltage level; feedback means for sampling said bias voltage and for supplying the bias voltage samples to said means for generating a first DC voltage level from a plurality of DC voltage levels.

16. The voltage source in accordance with claim 15, wherein said means for generating a first DC voltage level adjusts the bias voltage by modifying said first DC voltage level based on the bias voltage samples and a desired bias voltage level.

17. The voltage source in accordance with claim 16, further comprising:
means for utilizing said bias voltage as a negative bias voltage for gain stage amplifiers in a transmitter section of a portable cellular telephone.

18. The voltage source in accordance with claim 16, further comprising:
means for utilizing said bias voltage as a negative bias voltage for a liquid crystal display in a portable cellular telephone.

19. The voltage source in accordance with claim 16, further comprising:
means for utilizing said bias voltage as a negative bias voltage for regulating a voltage control oscillator in a dual-band cellular telephone.

20. The voltage source in accordance with claim 15, further comprising:
feedback means for sampling said bias voltage and for supplying the bias voltage samples to said means for generating one of a plurality of AC waveforms,
wherein said means for generating one of a plurality of AC waveforms adjusts the bias voltage by modifying said one of a plurality of AC waveforms based on the bias voltage samples and a desired bias voltage level.

21. The voltage source in accordance with claim 20, further comprising:
means for utilizing said bias voltage as a negative bias voltage for gain stage amplifiers in a transmitter section of a portable cellular telephone.

22. The voltage source in accordance with claim 20, further comprising:
means for utilizing said bias voltage as a negative bias voltage for a liquid crystal display in a portable cellular telephone.

23. The voltage source in accordance with claim 20, further comprising:
means for utilizing said bias voltage as a negative bias voltage for regulating a voltage control oscillator in a dual-band cellular telephone.

24. The voltage source in accordance with claim 15, wherein said means for generating one of a plurality of AC waveforms includes means for modifying AC waveform shape, AC waveform amplitude and AC waveform frequency.

25. A method for generating one of a plurality of bias voltages in a cellular telephone comprising the steps of:
generating a programmable, digital bit stream, wherein the programmable, digital bit steam represents one of plurality of AC waveforms;
converting the digital bit stream into an analog of AC waveform;
converting the analog waveform into a substantially DC voltage; and
applying the substantially DC voltage to an electronic, cellular telephone module in the cellular telephone, wherein the substantially DC voltage provides a bias voltage for the electronic, cellular telephone module.

26. The method of claim 25, wherein said step of applying the substantially DC voltage to the electronic cellular telephone module in the cellular telephone comprises the step of:

biasing a transmitter portion of the cellular telephone.

27. The method of claim 25, wherein said step of applying the substantially DC voltage to the electronic, cellular telephone module in the cellular telephone comprises the step of:

biasing a liquid crystal display on the cellular telephone.

28. The method of claim 25, wherein said step of applying the substantially DC voltage to the electronic, cellular telephone module in the cellular telephone comprises the step of:

biasing a voltage controlled oscillator, wherein the cellular telephone is a dual-band cellular telephone.

* * * * *